(12) United States Patent
Rivola et al.

(10) Patent No.: US 9,382,064 B2
(45) Date of Patent: Jul. 5, 2016

(54) ENVELOPE FOR OVERWRAPPING FILTER BAGS FOR INFUSION PRODUCTS AND SEALING DEVICE FOR OBTAINING THE OVERWRAPPING ENVELOPE

(71) Applicant: IMA INDUSTRIES S.R.L., 40064 Ozzano Dell'Emilia (IT)

(72) Inventors: Sauro Rivola, Riolo Terme (IT); Claudio Betti, Imola (IT)

(73) Assignee: IMA INDUSTRIES S.R.L., Ozzano Dell'Emilia (IT)

( * ) Notice: Subject to any disclaimer, the term of this patent is extended or adjusted under 35 U.S.C. 154(b) by 0 days.

(21) Appl. No.: 14/385,647

(22) PCT Filed: Apr. 16, 2013

(86) PCT No.: PCT/IB2013/053019
§ 371 (c)(1),
(2) Date: Sep. 16, 2014

(87) PCT Pub. No.: WO2013/156933
PCT Pub. Date: Oct. 24, 2013

(65) Prior Publication Data
US 2015/0047991 A1    Feb. 19, 2015

(30) Foreign Application Priority Data

Apr. 17, 2012    (IT) .............................. BO2012A0208

(51) Int. Cl.
*B65D 3/02*      (2006.01)
*B65D 85/808*    (2006.01)
(Continued)

(52) U.S. Cl.
CPC ............ *B65D 85/8085* (2013.01); *B29C 65/18* (2013.01); *B29C 66/1122* (2013.01); *B29C 66/21* (2013.01); *B29C 66/221* (2013.01); *B29C 66/223* (2013.01); *B29C 66/232* (2013.01); *B29C 66/431* (2013.01);
(Continued)

(58) Field of Classification Search
CPC .......... B65B 29/02; B65B 29/04; B65D 3/02; B65D 75/20; B65D 75/38; B65D 85/804; B65D 85/8043; B65D 85/8046; B65D 85/808; B65D 85/8085; B65D 85/812
USPC ................ 206/0.5, 484–484.2; 383/107, 108; 426/77–84
See application file for complete search history.

(56) References Cited

U.S. PATENT DOCUMENTS 2,335,159 A * 11/1943 Salfisberg ............ B65D 85/808
206/0.5
2,899,045 A * 8/1959 Irmscher ............ B65D 85/8085
206/0.5
(Continued)

FOREIGN PATENT DOCUMENTS

BE          768166 A1    12/1971

*Primary Examiner* — Bryon Gehman
(74) *Attorney, Agent, or Firm* — Pearne & Gordon LLP

(57) ABSTRACT

An overwrap envelope (7) containing a filter bag (1) for infusion products comprises a sheet (2) of overwrapping material folded into a U shape along its transversal axis (X) around the filter bag (1). The overwrap envelope (7) has two longitudinal sides (3, 4) and one transversal side (5) sealed by at least two sealing lines (6) which are uninterrupted along the longitudinal sides (3, 4) and along the transversal side (5). Each sealing line (6) is defined by two longitudinal stretches and one transversal stretch which are joined to obtain an uninterrupted shape and which form an uninterrupted perimeter seal.

9 Claims, 6 Drawing Sheets

(51) Int. Cl.
  *B29C 65/18* (2006.01)
  *B29C 65/00* (2006.01)
  *B65B 11/48* (2006.01)
  *B65D 75/20* (2006.01)
  *B65D 75/38* (2006.01)

(52) U.S. Cl.
  CPC .... *B29C 66/81435* (2013.01); *B29C 66/83241* (2013.01); *B29C 66/849* (2013.01); *B65B 11/48* (2013.01); *B65D 3/02* (2013.01); *B65D 75/20* (2013.01); *B65D 75/38* (2013.01)

(56) References Cited

U.S. PATENT DOCUMENTS

| | | | | |
|---|---|---|---|---|
| 2,947,415 A * | 8/1960 | Garth | ............... | B65D 75/30 206/484 |
| 3,131,065 A * | 4/1964 | Jacob | ............... | B65D 85/812 206/0.5 |
| 3,294,224 A * | 12/1966 | Harold | ............... | B65D 75/38 206/0.5 |
| 3,809,215 A * | 5/1974 | Dobry | ............... | B65D 85/812 206/0.5 |
| 4,176,746 A * | 12/1979 | Kooi | ............... | B65D 75/5855 206/484.1 |
| 4,415,597 A * | 11/1983 | Romagnoli | ............... | B65B 29/04 426/394 |
| 5,722,215 A | 3/1998 | Yuyama | | |
| 5,855,938 A * | 1/1999 | Cahill | ............... | B65B 29/04 206/0.5 |
| 8,091,729 B2 * | 1/2012 | Souard | ............... | B65D 75/20 206/484 |
| 9,102,464 B2 * | 8/2015 | Simanski | ............... | B65D 85/8043 |
| 2007/0087083 A1 | 4/2007 | Riley | | |
| 2008/0081089 A1 * | 4/2008 | Blanc | ............... | B65D 85/8046 426/77 |
| 2008/0254169 A1 * | 10/2008 | Macmahon | ............... | B65D 85/8043 426/77 |
| 2010/0040740 A1 | 2/2010 | Riley | | |

\* cited by examiner

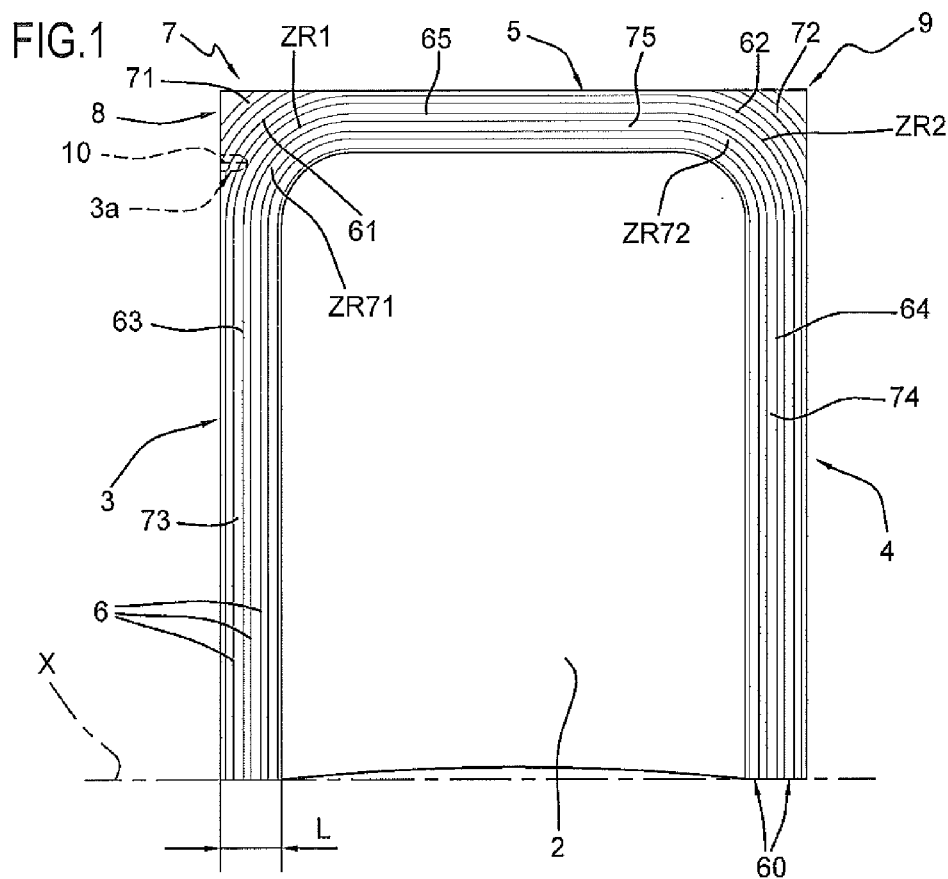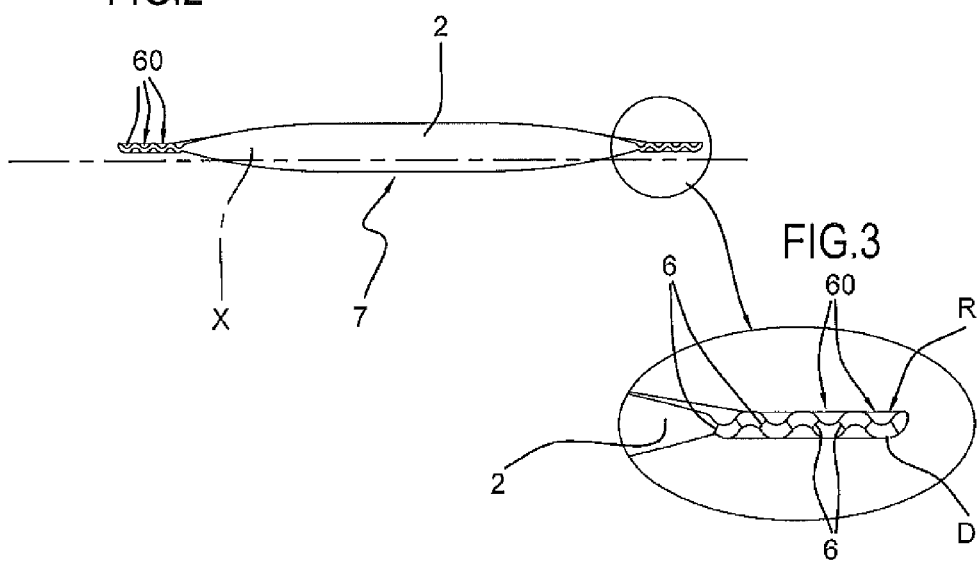

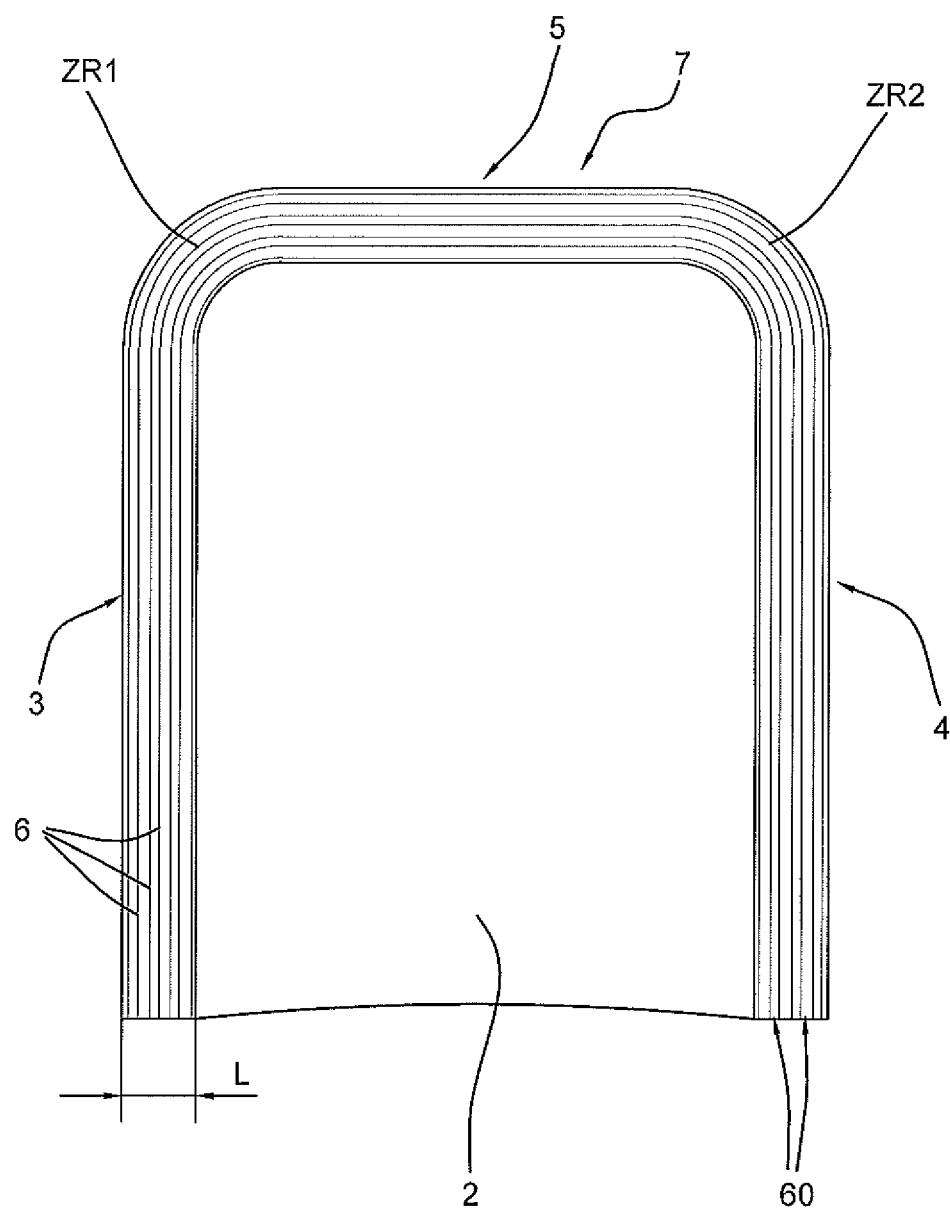

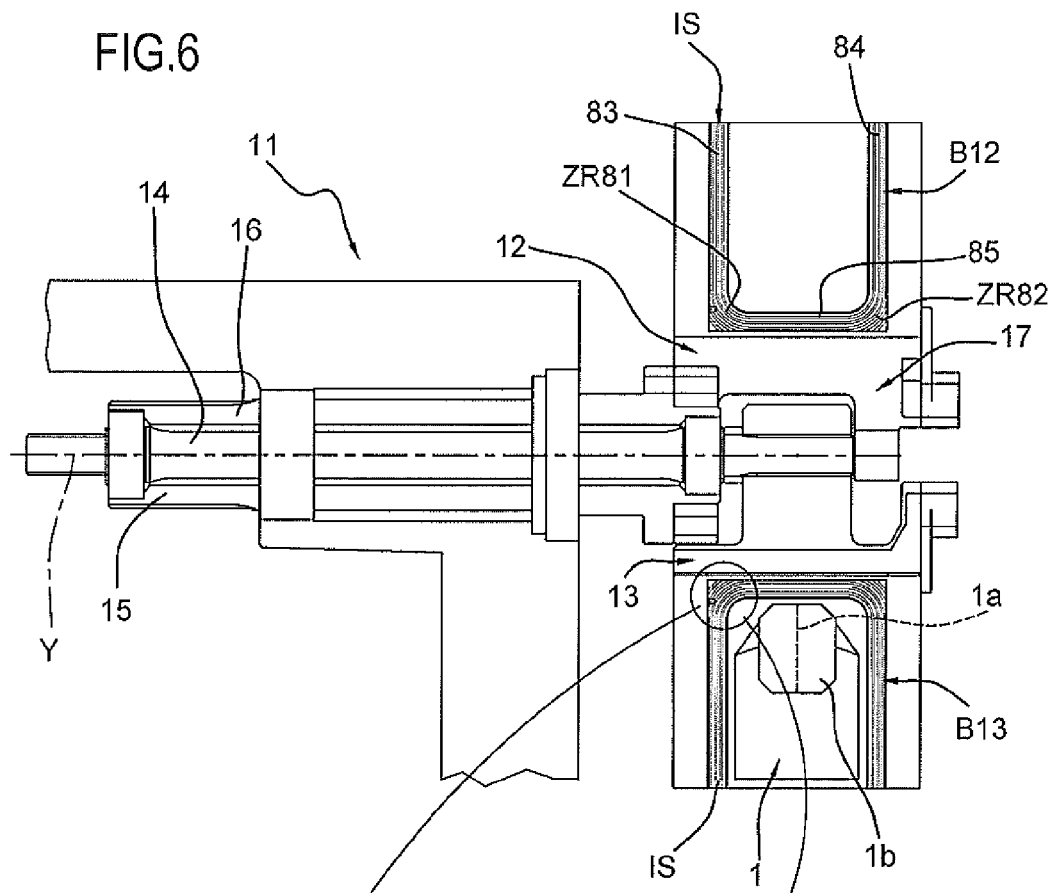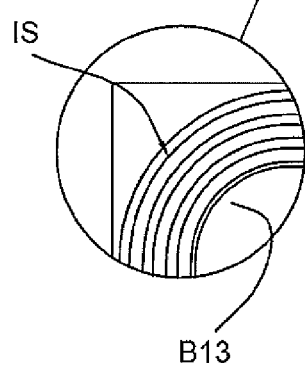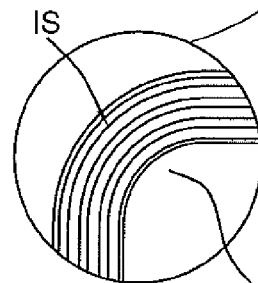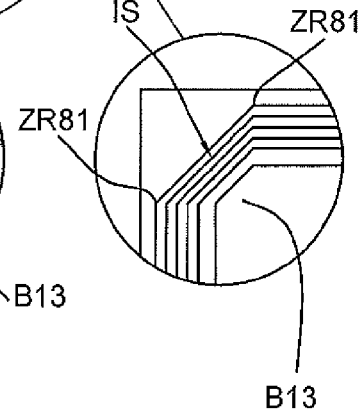

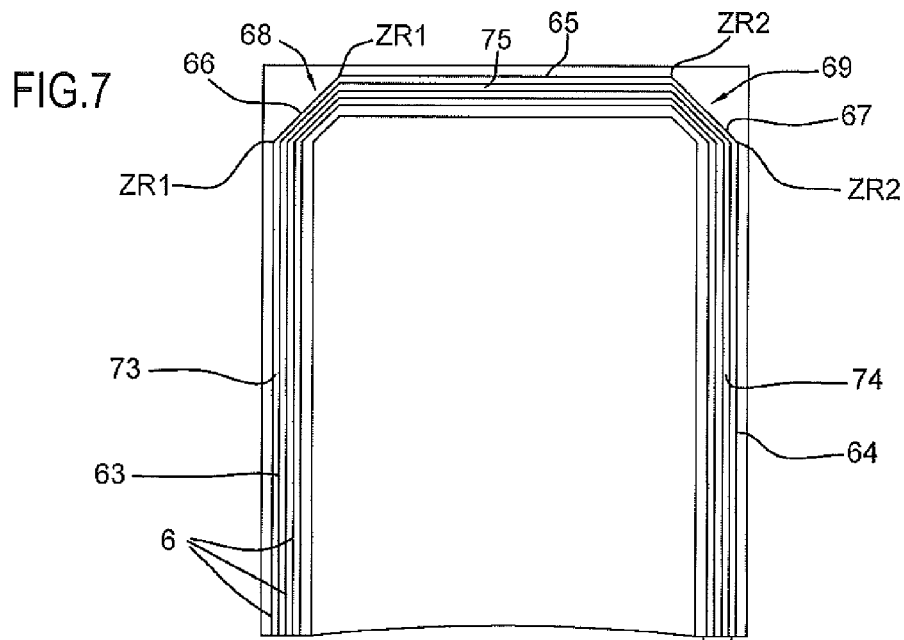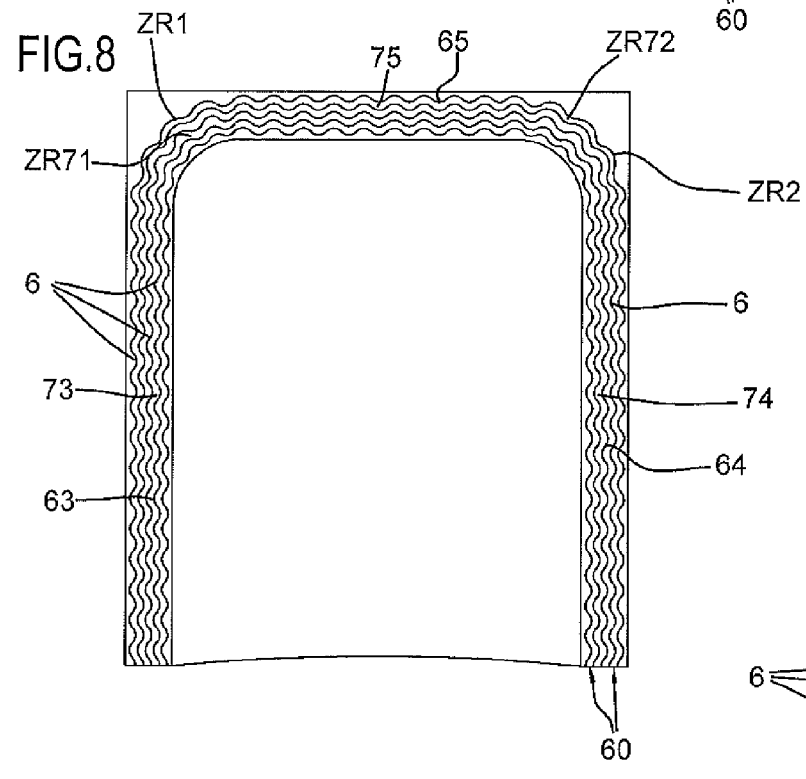

ENVELOPE FOR OVERWRAPPING FILTER BAGS FOR INFUSION PRODUCTS AND SEALING DEVICE FOR OBTAINING THE OVERWRAPPING ENVELOPE

TECHNICAL FIELD

This invention relates to an overwrap envelope containing a filter bag or pod for infusion or extract products, such as tea or coffee for example. The invention also relates to a sealing device for obtaining the overwrap envelope containing the filter bag or pod.

BACKGROUND ART

The above mentioned filter bags for infusion products may have one or more chambers containing an infusion or extract product. Known filter bags may have a pickup tag connected to the filter bag by a connecting string.

The pickup tag and the filter bag may be attached to the connecting string, in known manner, by knotting, heat sealing, a heat-sealable stamp, or other suitable means.

String and pickup tag are suitably positioned on the filter bag thus formed (for example, wound around and attached to the filter bag, or tucked inside it) to form a product ready to be packaged in suitable containers or boxes. It is also known in the prior art that the filter bags may be wrapped in overwrap envelopes made by folding a sheet of overwrapping material into a U shape around the filter bag to produce a finished package.

Normally, the overwrap envelope is sealed in one of the following two different ways:
if the overwrap envelope has an opening flap, the two longitudinal sides of the overwrap envelope are sealed; or
if the envelope does not have an opening flap, two longitudinal sides and one transversal side of the overwrapping sheet are sealed (of particular relevance for this specification).

To make overwrap envelopes without opening flap, the prior art teaches the use of machines comprising a plurality of grippers, each of which holds a single bag and which are arranged radially on a rotary carousel.

Following a rotation of the carousel, the filter bags are carried close to operating stations where the string and pickup tag are applied.

A further rotation of the carousel brings the filter bag close to a station where a continuous web of overwrapping material is fed. The sheet of overwrapping material used to make the overwrap envelope for a respective filter bag is cut from this web.

In the proximity of this feed station, the filter bag is moved radially away from the carousel through the agency of grippers in order to enable the sheet to be fed between the carousel grippers and the filter bag itself. The filter bag is then moved towards the carousel grippers again so that the sheet is folded into a U shape round the filter bag.

Next, the filter bag with the sheet of overwrapping material folded into a U around it is carried to a first sealing station, equipped with a first sealer, which makes a first set of sealing lines along the transversal side, or top, of the sheet. The transversal lines of the first set are straight and transversal to a direction of longitudinal extension, or, in other words, parallel to the transversal side of the overwrap envelope.

A further rotation of the carousel brings the partly sealed package to a pair of stretching rollers which move the partly sealed package away from the carousel towards a drum provided with recesses, each recess receiving a single package.

Following a rotation of the drum, the package, located inside a recess, is carried to a second sealing station equipped with a second sealer, which makes a second set of sealing lines along the longitudinal sides of the sheet. The sealing lines of the second set are straight and parallel to the direction of longitudinal extension of the overwrap envelope, that is to say, perpendicular to the lines of the first set of sealing lines.

Thus, at the zones of contact between the longitudinal sides and the transversal side, the overwrap envelopes just described have sealing lines of the first set which intersect sealing lines of the second set. In other words, the corner zones, where the longitudinal sides and the transversal side meet, are sealed twice. In these zones, the overwrapping material may thus be damaged and weakened.

Moreover, the machines which seal overwrap envelopes in two steps have some disadvantages. They are relatively expensive because they have two sealing stations and require very precise conveying devices to transport each package from the first sealing station to the second.

Alternatively to machines of this kind which perform sealing in two steps, machines are also known which can seal the longitudinal sides and the transversal side of the sheet of overwrapping material in a single step using a sealing gripper which is suitably shaped on three sides (and which is mounted directly on the aforementioned carousel). More specifically, the sealing gripper has sealing profiles or impressions, all parallel to each other and parallel to the direction of longitudinal extension of the overwrap envelope, which make corresponding sealing lines on the longitudinal and transversal sides of the overwrap envelope. As a result, on the transversal side of the envelope, the sealing lines are much shorter than the sealing lines on the longitudinal sides. The sealing lines on the transversal side of the envelope cannot, however, be shorter than a minimum length which guarantees the strength of the overwrap envelope. To prevent loss of seal strength, it is therefore necessary to use relatively long sheets of overwrapping material, longer than needed to contain the filter bag (unsealed). That means increased costs in terms of material used.

Similarly, it is also necessary to use relatively large sealers in order to make sealing lines which are long enough to guarantee seal strength.

AIM OF THE INVENTION

This invention has for an aim to provide an overwrap envelope for filter bags or pods for infusion or extract products, such as tea or coffee, which is capable of guaranteeing a secure seal and which can be made quickly, easily and with reduced waste.

A further aim is to provide a sealing device for making the overwrap envelope according to the invention and capable of sealing the overwrap envelope quickly and easily, with a guarantee of an excellent seal, in a single step and using sealers of reduced size.

These aims are fully achieved by the overwrap envelope containing a filter bag for infusion products according to claim 1 and by the sealing device according to claim 11.

More specifically, the overwrap envelope comprises a sheet of overwrapping material folded into a U shape along its transversal axis around a filter bag or a pod and has two longitudinal sides and one transversal side sealed by at least two sealing lines.

According to the invention, each sealing line comprises a first longitudinal stretch, a second longitudinal stretch and a transversal stretch connected to the first and second longitudinal stretches by at least one respective curved stretch so that each sealing line is uninterrupted along the two longitudinal sides and the transversal side.

Also according to the invention, two adjacent sealing lines define a sealing track comprising a first longitudinal portion, a second longitudinal portion and a transversal portion.

Also according to the invention, the transversal portion of the track is connected to the first longitudinal portion by at least one first curved portion and to the second longitudinal portion by at least one second curved portion.

Thanks to this specific shape of the sealing lines, the overwrap envelope has a stronger seal than prior art overwrap envelopes with sealing areas of the same size on the transversal side, or top, of the envelope, or with the same seal strength on a smaller sealing area on the transversal side of the envelope, thereby saving on overwrapping material.

The curved connecting stretches provide continuity between the longitudinal stretches and the transversal stretch at the corner zones where the longitudinal sides and the transversal side of the envelope meet: this allows the sealing lines to be formed in a single step without overlapping the sealing lines and with the guarantee of forming the seal without in any way interfering with the filter bag inside the envelope.

BRIEF DESCRIPTION OF THE DRAWINGS

These and other features of the invention will become more apparent from the following detailed description of a preferred, non-limiting embodiment of it, with reference to the accompanying drawings, in which:

FIG. 1 is a top plan view showing an overwrap envelope for filter bags for infusion products according to this invention;

FIG. 2 illustrates the envelope of FIG. 1 in a rear face view;

FIG. 3 shows an enlarged detail from FIG. 2;

FIG. 5 is a top plan view showing a further variant embodiment of the overwrap envelope for filter bags for infusion products according to this invention;

FIG. 6 is a schematic top plan view illustrating a sealing device for forming the overwrap envelope shown in the preceding figures;

FIGS. 6a, 6b and 6c are enlarged details of variants of the sealing device of FIG. 6 for forming the overwrap envelopes of FIGS. 4, 5 and 7, respectively;

FIG. 7 is a top plan view of an overwrap envelope according to a fourth embodiment of the invention;

FIG. 8 is a top plan view of an overwrap envelope according to a fifth embodiment of the invention;

FIGS. 8a and 9a are enlarged details of the envelopes of FIGS. 8 and 9, respectively.

DETAILED DESCRIPTION OF PREFERRED EMBODIMENTS OF THE INVENTION

FIGS. 1 to 3 illustrate an overwrap envelope 7 for containing a filter bag 1 (shown in FIG. 6) for infusion products such as tea, chamomile and the like. The filter bag 1 is of known type and may comprise, for example, one or two chambers for containing a charge of product, and a pickup tag 1b, connected to the chamber/chambers by a connecting string 1a.

Alternatively, the overwrap envelope 7 may contain a pod for infusion or extract products.

Figure 9:
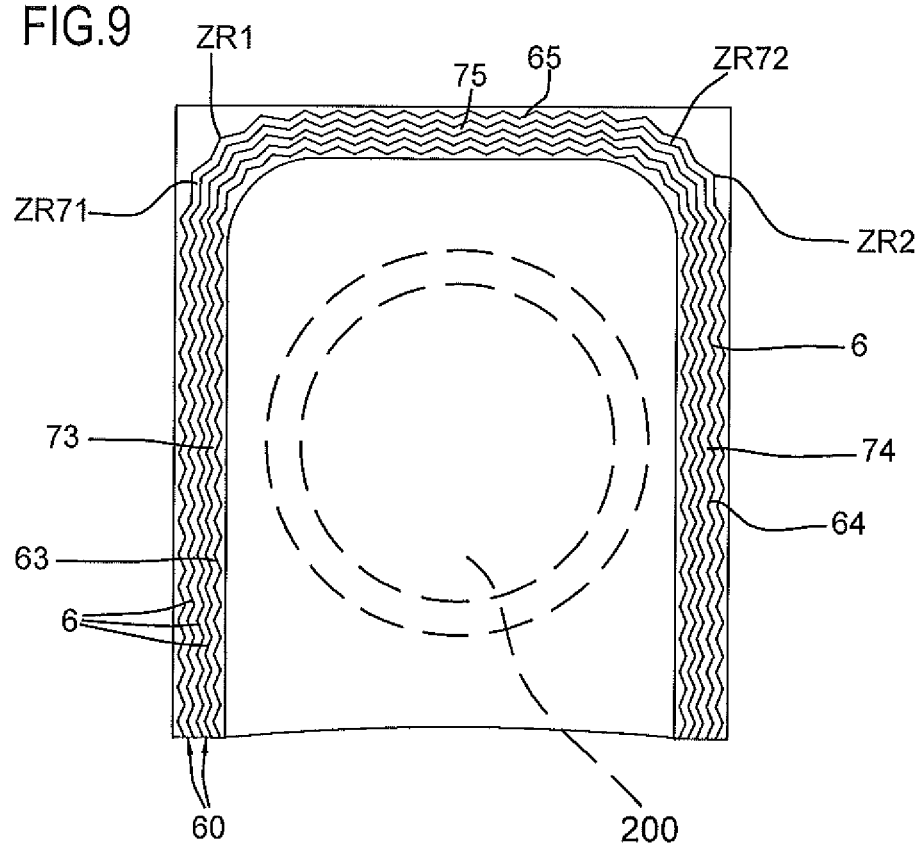
FIG. 9 is a top plan view of an overwrap envelope according to a sixth embodiment of the invention.

In FIG. 9, for example, the broken line schematically represents a circular pod 200 contained in the overwrap envelope 7.

According to the invention, the envelope 7 comprises a sheet 2 of overwrapping material folded along its transversal axis X around the filter bag 1 in such a way as to form an overwrap round the filter bag 1, with two longitudinal sides 3 and 4 and one transversal side, or top, 5.

Also according to the invention, the two longitudinal sides 3 and 4 and the top 5 are closed by at least two sealing lines 6 to form a pair of sealing lines 6. The sealing lines 6 are uninterrupted along the two longitudinal sides 3, 4 and along the transversal side 5.

Also according to the invention, each sealing line 6 comprises a first longitudinal stretch 63, a second longitudinal stretch 64 and a transversal, or top stretch 65. The first longitudinal stretch 63 is parallel to the second longitudinal stretch 64.

The first longitudinal stretch 63 and the second longitudinal stretch 64 are perpendicular to the transversal stretch 65 and parallel to the longitudinal sides 3 and 4 of the envelope 7.

The transversal stretch 65 is parallel to the transversal side 5 of the envelope 7.

The transversal stretch 65 is connected, at respective ends, to the first longitudinal stretch 63 by at least one first curved stretch ZR1 and to the second longitudinal stretch 64 by at least one second curved stretch ZR2, so that the sealing line 6 is uninterrupted along its full length.

In other words, each sealing line 6 forms an uninterrupted perimeter sealing path round the perimeter of the envelope 7.

Advantageously, the pair of sealing lines 6 has the shape of a U.

The curved stretches ZR1 and ZR2 of each of the sealing lines 6 are made at the contact zones 8 and 9 where the longitudinal sides 3 and 4 meet the transversal side 5, respectively.

The contact zones 8 and 9 define corners of the envelope 7 (see FIG. 1).

Preferably, the at least one first curved stretch ZR1 and the at least one second curved stretch ZR2 are arcuate.

Advantageously, the arcuate stretches ZR1 and ZR2 may have a curvature radius of between 0.3 and 20 mm, preferably between 0.5 and 8 mm.

Alternatively, the curvature radius of the arcuate stretches ZR1 and ZR2 may be between $1/250$ and $1/8$, preferably between $1/150$ and $1/10$, of the length of the longitudinal edge 3 or 4 of the envelope 7.

FIG. 7 illustrates an envelope 7 where the first longitudinal stretch 63 is connected to the transversal stretch 65 by two first curved stretches ZR1, which connect to a straight connecting stretch 66. Similarly, the second longitudinal stretch 64 is connected to the transversal stretch 65 by two second curved stretches ZR2, which connect to a straight connecting stretch 67.

In practice, the first longitudinal stretch 63 and the second longitudinal stretch 64 are connected to the transversal stretch 65 by respective chamfers 68, 69.

In embodiments not illustrated, the first longitudinal stretch 63 (and the second longitudinal stretch 64) might be connected to the transversal stretch 65 by three or more curved stretches ZR1 (and second curved stretches ZR2) which connect to two or more straight connecting stretches 66 (and 67), which may differ in length.

The envelopes 7 illustrated in the drawings have a plurality of sealing lines 6 (that is, more than two sealing lines). Preferably, the sealing lines 6 are parallel to each other.

Two adjacent sealing lines 6 define a sealing track, or furrow, or groove 60.

One sealing track 60 comprises a first longitudinal portion 73 and a second longitudinal portion 74 which are substantially parallel to the longitudinal sides 3 and 4 of the envelope 7, respectively. One sealing track 60 also comprises a transversal portion 75, which is substantially parallel to the transversal side 5 of the envelope 7.

The first longitudinal portion 73 is parallel to the second longitudinal portion 74. The first longitudinal portion 73 and the second 74 are perpendicular to the transversal portion 75.

The first longitudinal portion 73 is connected to the transversal portion 75 by at least one first curved portion ZR71. The second longitudinal portion 74 is connected to the transversal portion 75 by at least one second curved portion ZR72.

Advantageously, the sealing track 60 has the shape of a U.

The curved portions ZR71 and ZR72 of the sealing tracks 60 are made at the contact zones 8 and 9 where the longitudinal sides 3 and 4 meet the transversal side 5, respectively.

Preferably, the at least one first curved portion ZR71 and the at least one second curved portion ZR72 are arcuate.

According to the invention, the sealing track 60 is uninterrupted. In other words, two adjacent sealing lines 6 defining one sealing track 60 do not intersect or touch other.

Preferably, the sealing lines 6 defining a sealing track 60 are parallel to each other.

According to the invention, the envelope 7 may have one or more sealing tracks 60. Preferably, the sealing tracks 60 are parallel to each other.

Preferably, the envelope 7 comprises interrupted portions 71, 72 of sealing track 60 at the contact zones 8 and 9 where the longitudinal sides 3 and 4 and the transversal side 5 meet (see FIG. 1) formed by interrupted stretches 61, 62 of sealing line 6.

Alternatively, (see FIG. 4), the envelope 7 does not have interrupted portions 71, 72 of sealing track 60, or interrupted stretches 61, 62 of sealing lines 6 at the contact zones 8 and 9 where the top side 5 and the lateral sides 3 and 4 meet, so that the corner zones are smooth, without sealing lines 6 or tracks 60.

In a further embodiment (FIG. 5), the flat sheet 2 of overwrapping material is shaped to have rounded corners at the contact zones 8 and 9.

In other words, the envelope 7 of FIG. 5 has a profile defined by a sealing line 6. The envelope 7 of FIG. 5 does not have interrupted stretches 61, 62 of sealing line 6, or interrupted portions 71, 72 of sealing tracks 60.

Viewed in transversal cross section, a sealing track 60 has a convexity D and a concavity R formed by hot or cold plastic forming.

Viewed in transversal cross section, a plurality of sealing tracks 60 running side by side form the shape of a coil (see FIG. 3). The coil has convexities D alternated with concavities R.

In light of this, the coiled shape formed by the succession of tracks 60 forms a series of mutually parallel convexities D and concavities R running along the longitudinal sides 3 and 4 and along the transversal side 5 of the envelope 7, to form an uninterrupted path.

In the embodiments illustrated, the envelopes 7 comprise eight sealing lines 6 and seven sealing tracks 60 running side by side, with a constant total width L along the longitudinal sides 3 and 4 and the transversal side 5. The total width L, given by the number of sealing tracks 60, may be suitably chosen as a function of the size of the envelope 7, of the size of the filter bag 1, and of the sealing strength or security required.

A different number of sealing tracks 60 (two, three, five or more sealing tracks 60) is imaginable.

Figure 4:
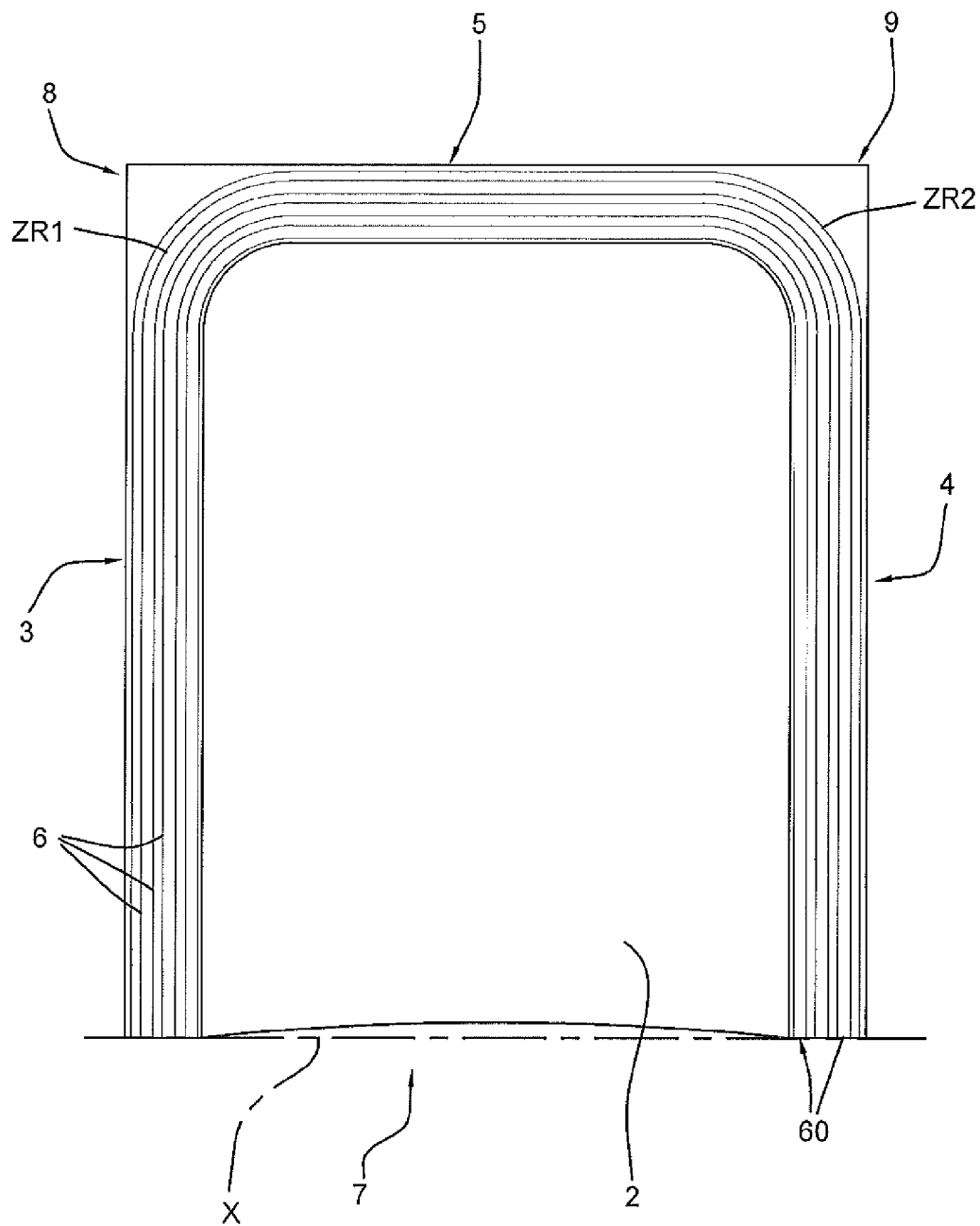
FIG. 4 is a top plan view showing a variant embodiment of the overwrap envelope for filter bags for infusion products according to this invention.

In the envelopes 7 illustrated in FIGS. 1, 4 and 5, the first longitudinal stretch 63, the second longitudinal stretch 64 and the transversal stretch 65 are defined by two straight sealing lines 6 or a straight track 60.

If it has more than two sealing lines 6, the envelope 7 may comprise at least one opening area 3a at the joining zones 8 and/or 9, where at least one sealing line 6 is interrupted to form a transversal opening notch 10. The opening area 3a and the notch 10 are represented by broken lines in FIG. 1. In an embodiment not illustrated, the envelope 7 may comprise two opening areas 3a, with respective notches 10, at the first longitudinal side 3 and at the second longitudinal side 4.

Whatever the case, the opening area 3a and the notch 10 do not affect all the sealing lines 6. In other words, at least one sealing line 6 is not interrupted by the notch 10.

FIGS. 8 and 9 show further embodiments of the overwrap envelope according to the invention, where the longitudinal stretches 63, 64 and the transversal stretch 65 of the sealing lines 6 are not rectilinear but, for example, sinusoidal (FIG. 8) or zigzagged (FIG. 9). In the case of sinusoidal or zigzagged longitudinal stretches 63, 64 and a sinusoidal or zigzagged transversal stretch 65, all the sealing lines 6 may be mutually parallel to form a sealing track 60 of constant width.

Figure 9A:
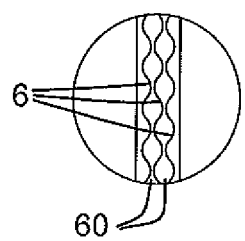

Alternatively, alternate sealing lines 6 may be mutually parallel, so that adjacent sealing lines 6 form sealing tracks 60 whose width varies (FIGS. 8a and 9a), for example varies with regularity.

This particular sinusoidal or zigzag shape or form means that the sealing lines in their entirety are longer than the straight lines shown in FIGS. 1, 4 and 5: this increases the overall seal strength of the envelope 7.

The invention also provides a device for sealing the overwrap envelope 7 described above.

With reference in particular to FIG. 6, the device according to the invention comprises sealing means 11 operating on the sheet 2 of overwrapping material folded into a U along its transversal axis X around the filter bag 1 (or around a pod).

Also according to the invention, the sealing means 11 comprise a gripper with two opposed arms 12, 13, each of which has a respective sealing plate B12, B13 mounted on it.

Preferably, the two gripper arms 12 and 13 rotate about the same shaft 14 to move between an open, non-working position and a closed, working position (not illustrated).

Preferably, the two arms 12 and 13 are articulated about an axis Y on respective shafts 15, 16 which are coaxial with each other.

The two arms 12 and 13 are moved between the open, non-working position and the closed, working position by lever means 17.

The sealing plates B12 and B13 have at least two matching sealing impressions IS to make at least two sealing lines 6 on the sheet 2 of overwrapping material.

Each sealing impression IS is uninterrupted and designed to seal the longitudinal sides 3 and 4 and the transversal side 5 of the envelope 7. At the closed, working position, the longitudinal sides 3 and 4 and the transversal side 5 of the envelope 7 are sealed simultaneously.

Each sealing impression IS substantially coincides in shape with the sealing lines 6 described above with reference to the envelope 7 (FIGS. 6a, 6b and 6c).

More in detail, each sealing impression IS comprises a transversal stretch 85 and two longitudinal stretches 83, 84 connected to the transversal stretch 85 by respective curved stretches ZR81, ZR82.

Preferably, the curved stretches ZR81, ZR82 of each sealing impression IS are arcuate stretches.

Advantageously, the curved stretches ZR81 and ZR82 of each of the sealing impressions have a curvature radius of between 0.3 and 20 mm, preferably between 0.5 and 8 mm.

Alternatively, the curvature radius of the curved stretches ZR81 and ZR82 of each of the sealing impressions may be between 1/250 and 1/8, preferably between 1/150 and 1/10, of the length of the longitudinal stretches of the sealing impression.

Each sealing plate B12, B13 may comprise a plurality of sealing impressions IS. Two adjacent sealing impressions IS of one plate, in conjunction with two respective adjacent sealing impressions IS of the other plate, make one sealing track 60 on the envelope 7.

The sealing impressions IS may all be mutually parallel to define sealing tracks 60 of constant width.

The longitudinal and transversal stretches of the sealing impressions IS may be rectilinear, sinusoidal or zigzagged.

In the case of sinusoidal or zigzagged longitudinal and transversal stretches, the sealing impressions IS may be mutually parallel to define sealing tracks 60 of constant width. Alternatively, alternate sealing impressions IS may be mutually parallel, so that adjacent sealing lines 6 form sealing tracks 60 whose width varies, for example with regularity.

The plates B12, B13 may have interrupted stretches of sealing impressions IS designed to form interrupted stretches 61, 62 of sealing lines 6 at the contact zones 8 and 9 where the longitudinal sides 3 and 4 meet the transversal side 5 of the envelope 7.

Preferably, there is a matrix die on one of the sealing plates (B12 or B13) to match a punch die formed on the other sealing plate (B13 or B12) in order to make on the envelope 7 an opening area 3a with a respective notch 10 (see FIG. 6). For simplicity, neither the matrix die nor the punch die is illustrated in FIGS. 6a, 6b, 6c.

The sealing plates B12, B13 illustrated in FIG. 6 comprise a plurality of sealing impressions IS whose profile is coil shaped in cross section in such a way as to obtain on the envelope a plurality of convexities alternated with concavities.

The envelope thus obtained fully achieves the preset aims thanks to a single sealing step forming on the envelope a seal which is uninterrupted and has suitably shaped corners.

The envelope can therefore guarantee a seal of excellent quality thanks to the continuity of the seal, its high mechanical strength and good aesthetic appeal.

The possibility of a single sealing action allows the sealing device to be structured in a simpler and more effective manner and also makes sealing quicker and more secure.

The invention claimed is:

1. An overwrap envelope containing a filter bag (1) for infusion products or a pod for infusion or extract products, the overwrap envelope comprising a sheet (2) of overwrapping material folded into a U shape along its transversal axis (X) around the filter bag (1) or the pod and having two longitudinal sides (3, 4) and one transversal side (5) sealed by at least two sealing lines (6),
characterized in that each of the at least two sealing lines (6) comprises a first longitudinal stretch (63), a second longitudinal stretch (64) and a transversal stretch (65), the transversal stretch (65) being connected to the first longitudinal stretch (63) by at least one first curved stretch (ZR1) and to the second longitudinal stretch (64) by at least one second curved stretch (ZR2), so that each of the at least two sealing lines (6) is uninterrupted along the two longitudinal sides (3,4) and the transversal side (5), the at least two sealing lines (6) being disposed adjacent one another and defining a sealing track (60) comprising a first longitudinal portion (73), a second longitudinal portion (74) and a transversal portion (75); the transversal portion (75) being connected to the first longitudinal portion (73) by at least one first curved portion (ZR71) and to the second longitudinal portion (74) by at least one second curved portion (ZR72).

2. The envelope according to claim 1, wherein the at least one first curved stretch (ZR1) and the at least one second curved stretch (ZR2) are made at contact zones (8, 9) where respective ends of the transversal side (5) and of the longitudinal sides (3, 4) meet.

3. The envelope according to claim 1, wherein the first longitudinal stretch (63) is substantially parallel to the second longitudinal stretch (64), the first longitudinal stretch (63) and the second longitudinal stretch (64) being substantially perpendicular to the transversal stretch (65).

4. The envelope according to claim 1, wherein each of the at least two sealing lines (6) has the shape of a U.

5. The envelope according to claim 1, wherein the sealing track (60) is uninterrupted along the longitudinal sides (3, 4) and along the transversal side (5) of the envelope (7).

6. The envelope according to claim 1, wherein the sealing track (60) is defined by the at least two sealing lines (6) which are adjacent and which do not intersect or touch each other.

7. The envelope according to claim 1, wherein the first longitudinal stretch (63), the second longitudinal stretch (64) and the transversal stretch (65) of each of the at least two sealing lines (6) have a sinusoidal or zigzag shape.

8. The envelope according to claim 1, wherein the sealing track (60) has a constant width.

9. The envelope according to claim 1, wherein the sealing track (60) has a variable width.

\* \* \* \* \*